Dec. 18, 1951   E. D. GEORGE   2,579,425
APPARATUS FOR DUSTING STRIP MATERIAL
Filed June 29, 1949   4 Sheets-Sheet 1
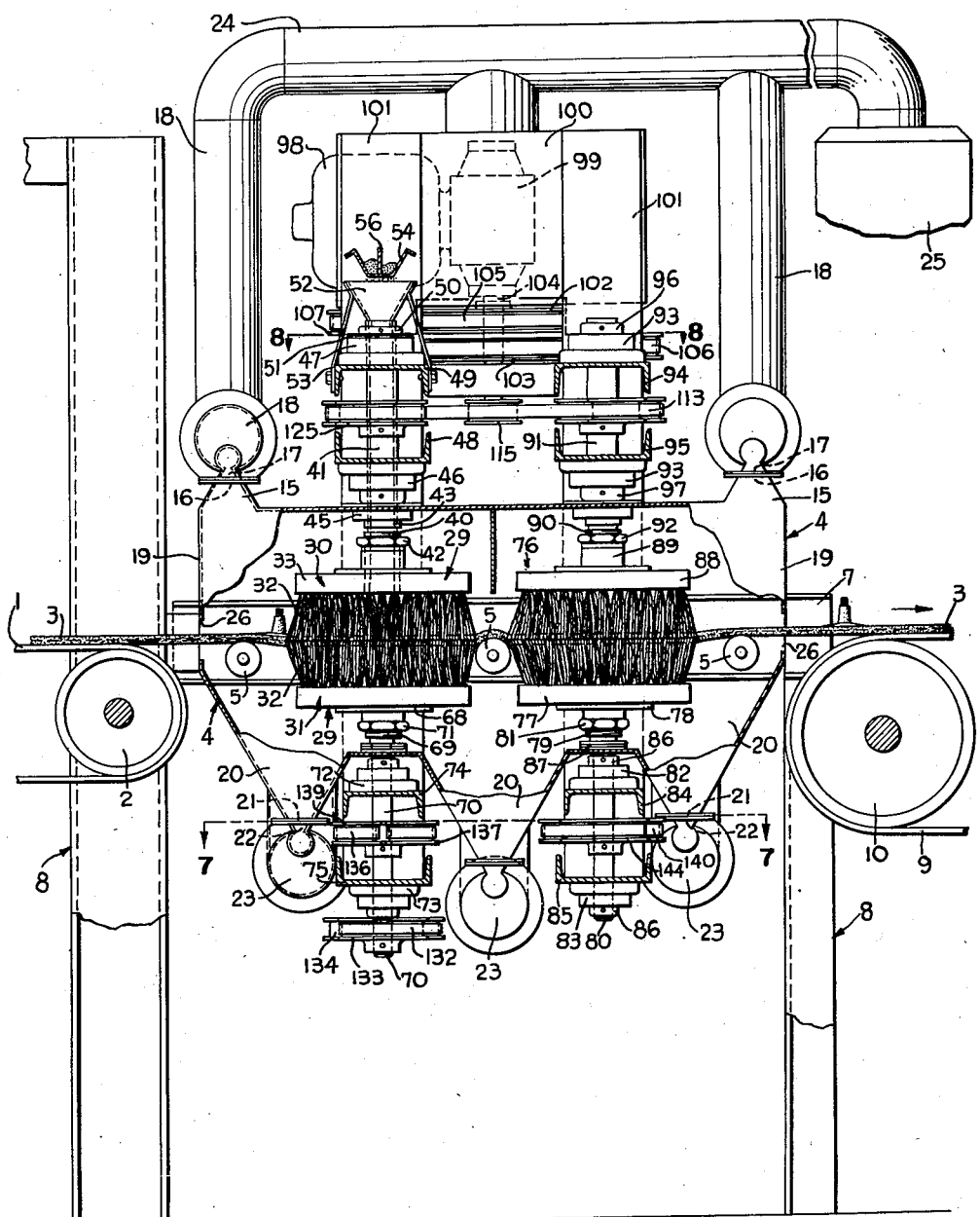
FIG. I
Inventor
EVERETT D. GEORGE
By
*R. H. Waters*
ATTORNEY

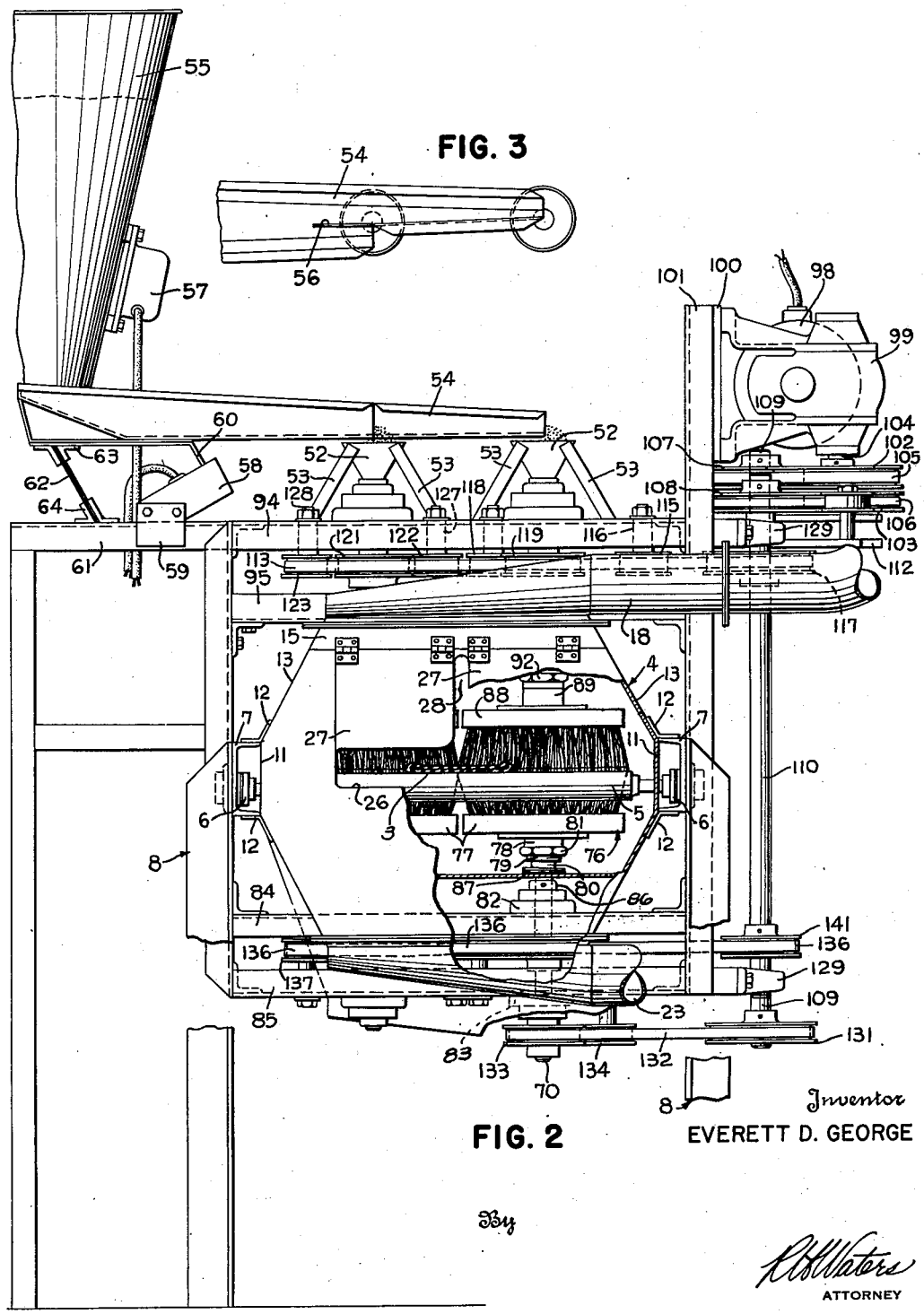

Dec. 18, 1951  E. D. GEORGE  2,579,425
APPARATUS FOR DUSTING STRIP MATERIAL
Filed June 29, 1949  4 Sheets-Sheet 3
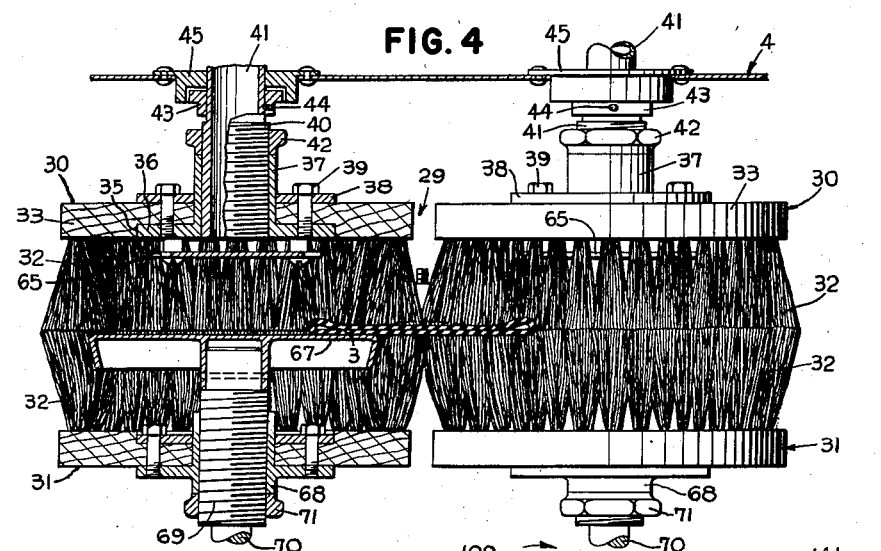
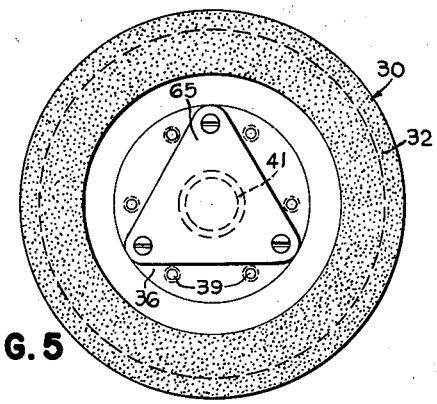
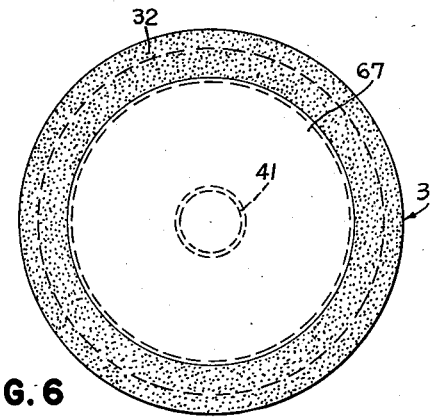
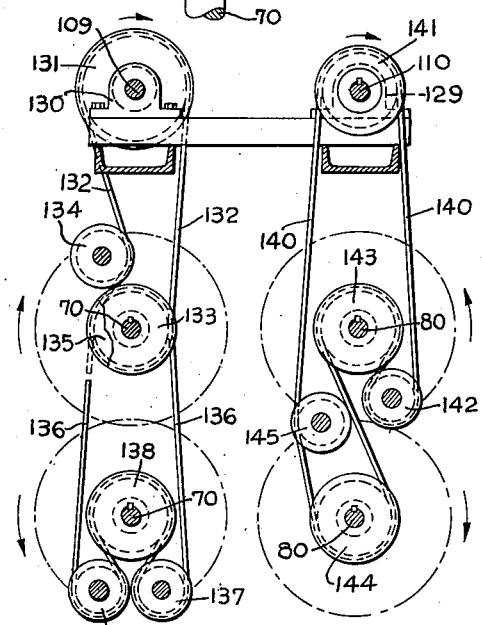
Inventor
EVERETT D. GEORGE
By
R. H. Waters
ATTORNEY Dec. 18, 1951      E. D. GEORGE      2,579,425
APPARATUS FOR DUSTING STRIP MATERIAL
Filed June 29, 1949      4 Sheets-Sheet 4
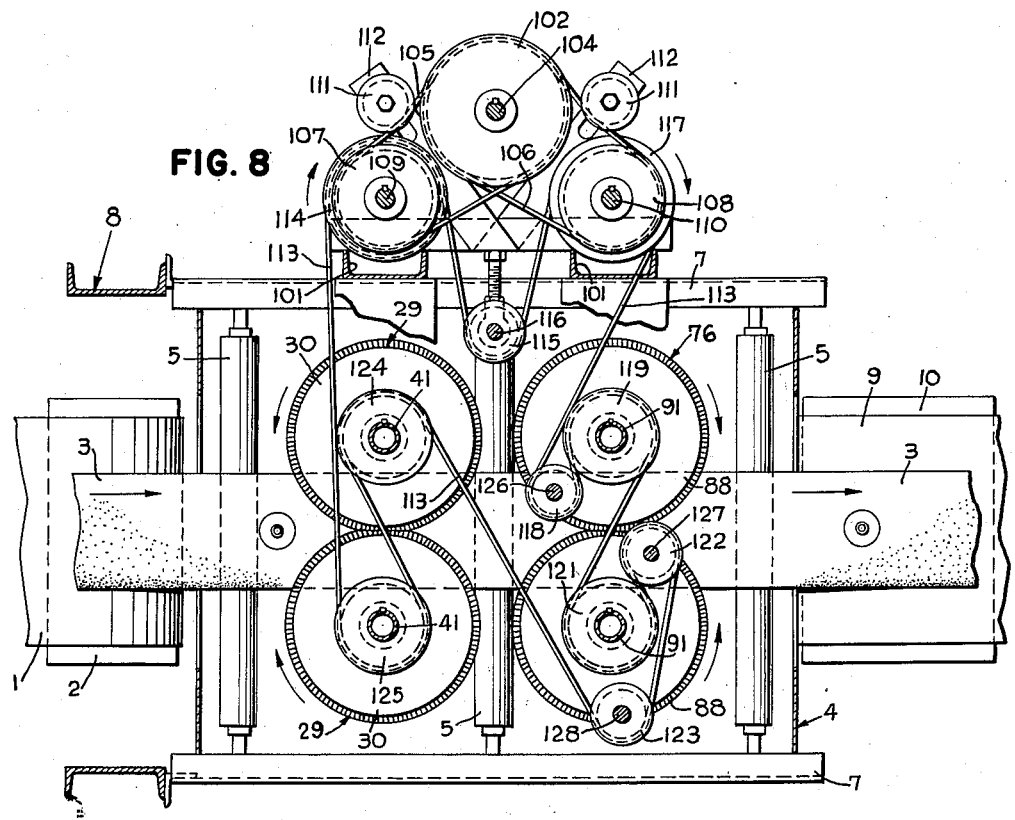
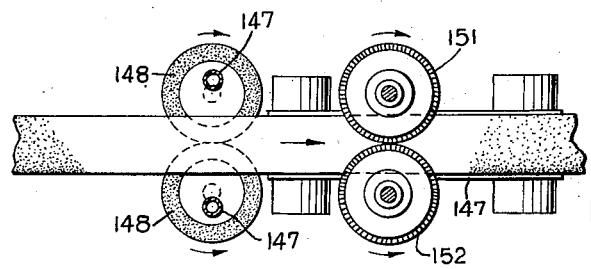
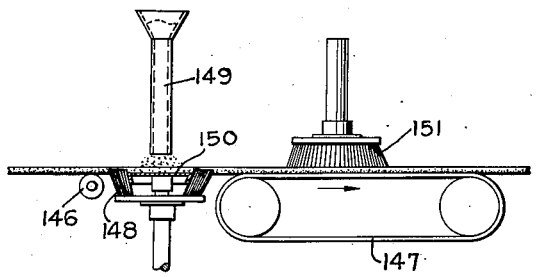
Inventor
EVERETT D. GEORGE
ATTORNEY Patented Dec. 18, 1951

2,579,425

UNITED STATES PATENT OFFICE 2,579,425

APPARATUS FOR DUSTING STRIP MATERIAL

Everett D. George, Cuyahoga Falls, Ohio, assignor to Wingfoot Corporation, Akron, Ohio, a corporation of Delaware Application June 29, 1949, Serial No. 101,962

9 Claims. (Cl. 91—59)

The present invention relates to improvements in apparatus for use in coating strip material with a pulverulent or subdivided material in the form of powder or dust, and is particularly adapted for use in dusting unvulcanized tacky rubber inner tube stock with powdered soapstone or the like.

The inner tube stock is tubed from a tube machine in cylindrical form and delivered onto a belt conveyor to be carried to the various stations for the necessary operations to form same into a circular tube to become the air container for automobile tires. The tube stock, when delivered to the belt conveyor, is dusted on the inside by apparatus attached to the tube machine head. The stock as received by the belt conveyor is in a flaccid condition. The walls of the tube collapse on the belt, presenting a flat strip-like form.

The outer surface of the tube is tacky or sticky and presents a slightly irregular surface. One of the important objects of the present invention is to provide an apparatus that will apply pulverulent material to the entire outer surface of the unvulcanized tube stock and to spread and brush the pulverulent evenly over the surface in an efficient and economical manner so that the dust coating will serve as a lubricant to prevent the tubes adhering to the mold in which they are vulcanized.

Another object of the invention is to provide a coating of dusting material so that the stock may more expeditiously be handled during the cutting to length, splicing and placing in the mold. Because of its flaccid, tacky condition, the tube stock cannot be folded upon itself without a coating of the dusting material to prevent adhesion.

The aforesaid objects and other objects of the invention, which will become apparent as the description proceeds, are achieved by an apparatus which operates in conjunction with a belt conveyor system of which the apparatus becomes a part. The apparatus consists of a dusting chamber having roller means for supporting and guiding the tube stock therethrough, circular revolving brush means arranged in groups in the chamber, the first group of brushes (two top and two bottom) having distributor plates attached thereto to receive and throw or scatter the pulverulent material into the bristles of the brushes which spread and brush the pulverulent over the entire surface of the tacky tube stock. The second group of circular revolving brushes (also two top and two bottom) brush the excess dust from the tube stock, leaving an even coating of dust thereon.

The pulverulent material is supplied from a hopper dispensing means from which extend a chute from which the pulverulent material falls by gravity through hollow shafts of tubular form which drive the top brushes of the first group. The brushes of the second group serve to brush the excess dust from the tube stock, leaving an even coating thereon. A system of ducts is connected to the dusting chamber in which a fan creates a suction to carry the dust-laden air from said chamber to a dust collector where the dust is reclaimed for further use.

For a complete understanding of the invention, reference should be had to the accompanying drawings in which:

Figure 1 is a side elevation of the apparatus partly in section and with parts broken away;

Figure 2 is an end view of the apparatus with parts broken away, showing the relation of the tube stock with the brushes;

Figure 3 is a plan view of the chute extending from the pulverulent dispenser;

Figure 4 is an enlarged view, partly in section, of the dusting brushes;

Figure 5 is a bottom view of a top dusting brush;

Figure 6 is a plan view of one of the lower dusting brushes;

Figure 7 is a view taken on the line 7—7 of Figure 1, showing the drive for each group of lower brushes;

Figure 8 is a view taken on the line 8—8 of Figure 1, showing the drive for the top brushes of both groups;

Figure 9 is a plan view of a modified form of the invention, whereby two brushes may be used in each group instead of four;

Figure 10 is a side elevation of the form of the invention shown in Figure 9.

With specific reference to the form of invention shown in the drawings, the numeral 1 indicates a conveyor belt which travels over a pulley 2. The belt delivers unvulcanized tacky tube stock 3 to the dusting chamber, generally designated by the numeral 4. The tube stock 3 is supported and guided through the dusting chamber 4 by rollers 5 mounted in bearings 6 which are attached to members 7 of a framework generally designated by the numeral 8.

The tube stock emerges from the dusting chamber and is carried to the cutting to length and splicing operations by a belt 9 which travels over the pulley 10.

The dusting chamber 4 is composed of sheet metal, the side walls of which are provided with central perpendicular surfaces 11 (see Fig. 2) for convenience in attaching the chamber to the channel members 7 by the angular clips 12 which support the chamber 4 in the framework 8. From the surface 11 the upper walls 13 taper inwardly to the top which has extending from each end thereof tapered sections 15 having slots 16 formed in the apex thereof which connect with slots 17 formed in ducts 18 connected to the tapered sections 15.

The end walls 19 extend perpendicularly downward for approximately half their distances, then taper inwardly to the bottom of the chamber, terminating in a series of downwardly tapered sections 20 having slots 21 in the apexes thereof which connect with slots 22 in ducts 23. The ducts 18 and 23 lead to a main duct 24 connected to a dust collector 25 in which the dust is reclaimed for further use. The tapered walls and the tapered sections of the chamber provide an uninterrupted flow of the dust-laden air from the chamber into the ducts, eliminating corners or other longitudinal surfaces where the pulverulent material could settle to lay dormant, then fall by its own weight into the brushes or ducts, causing an excess of the material that could not be efficiently handled by the brushes or ducts. The suction system creates a negative pressure in the chamber to carry the dust-laden air therefrom. Said negative pressure is relatively low due to the fact that the pulverulent material is fed to the brushes by gravity in the proper quantity instead of being blown into the chamber by pressure as in previous apparatus. There is no pressure to overcome. Openings 26 formed in the ends of the chamber for convenience in starting the stock therethrough and inspection are partially covered by hinged doors 27 which are foreshortened to provide a passageway for the tube stock into and out of the chamber. A vertical slot 28 is formed in the doors 27 to provide clearance for the tube valve stems which have previously been attached to the tube stock.

Disposed within the dusting chamber 4 are two groups of brushes. The first group generally indicated by the numeral 29 comprises two upper brushes 30 and two lower brushes 31, the bristles 32 of which meet in opposed relationship. The upper brushes 30 consist of a circular disclike block or base 33 having a circular formation of bristles 32 secured adjacent the outer periphery of said blocks. The inner sides of the blocks are provided with counter bores 35 (see Fig. 4) to receive flanges 36 of an internally threaded sleeve 37 which is secured to the blocks by a washer 38 and bolts 39, the sleeve being secured to threaded portions 40 of the tubular shafts 41 and locked thereon by lock nuts 42.

The tubular shafts extend upward and out of the chamber 4 through baffle arrangements comprising interfitting flanges 43 attached to the tubular shafts 41 by set screws 44 and flanges 45 attached to the top of the chamber 4. The flanges 43 and 45 are bored to provide clearance to prevent cutting or rapid wear of the shafts 41, and also provide a baffle so that the negative pressure within the chamber will be effective in carrying the dust-laden air from the chamber and prevent dust settling about the flanges.

The tubular shafts (see Fig. 1) are held and revolved in bearings 46 and 47 attached to cross members 48 and 49 of the frame 8. The shafts are prevented from vertical axial movement by collars 50 attached to the upper ends thereof above thrust bearings 51. Mounted above the upper ends of the tubular shafts 41 (see Figs. 1 and 2) and extending therein, funnels 52 supported by braces 53 receive pulverulent material from a chute 54, extending from the bottom of a hopper 55. The chute extends over the funnels 52, one side of which is foreshortened to supply the material to the first funnel, the second funnel being supplied from the end of the chute, the pulverulent material being guided thereto by a partition plate 56. The proper amount of material is assured by a suitable agitating means or vibrator unit 57 attached to the hopper 55. Also a vibrator unit 58 supported on the frame 8 by the plates 59 is attached to the chute by the supporting bracket 60. The chute is also connected to the cross member 61 of the frame 8 by a flexible sheet or leaf spring 62 supported by brackets 63 and 64. The flexible sheet aids in supporting the chute but permits vibration of same to agitate the pulverulent material to provide even flow of the material in the proper amount to the funnels 52.

From the funnels the pulverulent material drops by gravity through the cylindrical shafts 41 onto distributor plates 65 attached to the inner side of the upper brushes 30, said plates being triangular in shape to provide space between the sides thereof and the bristles so that material may drop on the plates of the lower brushes. As the brushes revolve, the remaining dusting material is thrown by centrifugal force into the bristles of the upper brushes and brushed onto the top of the tube stock 3. The excess material not absorbed by the bristles falls onto plates 67 attached to the inner side of the lower brushes 31 which throws the material into the bristles of the lower brushes 31 which brush the dusting material onto the under side of the tube stock. The plate 67 extends to near the ends of the bristles 32 of the brushes 31, and serves as a support for the tube stock between the rollers; this also prevents rapid wear of the bristles. The lower brushes 31 are mounted on flanged sleeves 68 having an inner threaded bore which receives a threaded section 69 of vertical shafts 70 and is secured thereon by a lock nut 71. The vertical shafts 70 are mounted in bearings 72 and 73 mounted on cross members 74 and 75 of the frame 8.

The strip material, after being dusted by the brushes 30 and 31, pass between the second group of brushes 76 which brush from the tube stock the surplus dusting material which rises into the air and is removed from the chamber by the suction system.

The second group of brushes 76 are of the same form and construction as the first group 29 except for the discs 65 and 67. The lower brushes 77 of group 76 (see Fig. 1) are mounted on flanged sleeves 78 having internal screw threads formed therein for mounting on a threaded section 79 of vertical shafts 80 and locked thereon by lock nuts 81. The shafts are supported in bearings 82 and 83 mounted on cross members 84 and 85 of the frame 8. Set collars 86 are provided to keep the shafts in vertical position and a thrust bearing 87 is provided to take the downward thrust.

The upper brushes 88 of group 76 are mounted on internally threaded flanged sleeves 89 secured on a threaded section 90 of vertical shafts 91 by lock nuts 92. The shafts 91 are supported in bearings 93 mounted on cross members 94 and 95 of the frame 8. Set collars 96 and 97 retain the shafts in vertical alignment.

Both groups of brushes are driven by a motor 98 having a gear reduction unit 99 incorporated therewith which is attached to a plate 100 mounted on the upright members 101 (see Fig. 2). Drive pulleys 102 and 103 are secured to shaft 104 extending from the gear reduction unit 99 through belts 105 and 106. Drive pulleys 107 and 108 are attached to the vertical drive shafts 109 and 110, the tension in the belt being regulated by idler pulleys 111 slidably mounted on brackets 112 extending from the frame 8.

It is important to drive the brushes spaced opposite one another in opposite directions as indicated by arrows in Fig. 8 to prevent stretching or bulging of the stock due to frictional contact of the brushes with the tube stock, as would be the effect if all the brushes were permitted to revolve either with or against the movement of the tube stock. The reverse direction of all the top brushes of each group is accomplished by a series of pulleys and a single endless belt as follows. A belt 113 is driven by pulley 114 secured to the shaft 109. The belt extends from pulley 114 to a tension regulating roller pulley 115 mounted on a shaft 116 secured to the frame 8, then over the pulley 117 and idler pulley 118 to pulley 119 which is secured to a shaft 91 to revolve one of the brushes 88, then to pulley 121 to revolve the other brush 88 in the opposite direction. The belt then passes over the idlers 122 and 123 to pulley 124, revolving one of the brushes 30, then to pulley 125 to revolve the other brush 30 in the opposite direction. The belt then leads back to the pulley 114. The idler pulleys 118, 122 and 123 are mounted on stud shafts 126, 127 and 128 attached to the frame 8.

The lower bushes are driven as follows. The shafts 109 and 110 extend downward and are mounted in bearings 129 and 130 attached to the frame 8. The lower dusting brushes of the first group as illustrated in Figs. 2 and 7 are driven from shaft 109 at the lower end of which is attached a pulley 131 which drives a belt 132 that extends to pulley 133 mounted on a vertical shaft 70 to drive one of the brushes 31 in clockwise direction. An idler pulley 134 is adjustably mounted to provide the proper tension of the belt 132. A pulley 135 mounted on shaft 70 at the lefthand side of the tube stock below pulley 133 carries a belt 136 which extends to an idler pulley 137 to pulley 138 mounted on shaft 70 at the right side of the tube stock to rotate the other bottom brush 31 in the opposite direction. The belt passes from pulley 138 to idler 139 to pulley 135 to complete the drive for the lower dusting brushes.

The lower wiping brushes 77 of group 76 are driven by a belt 140 from a pulley 141 mounted on the shaft 110. The belt leads from pulley 141 to an idler pulley 142, then to pulley 143 mounted on a shaft 80 at the lefthand side of the strip material to drive one of the circular brushes 77 in a counter-clockwise direction. The belt leads from pulley 143 to pulley 144 mounted on shaft 80 on the righthand side of the strip material which revolves the other circular brush 77 in a clockwise direction. The belt then passes over idler pulley 145 to pulley 141.

Illustrated in Fig. 10 is a modified form of the invention in which the strip material is conveyed through a dusting chamber by a roller 146 and a short belt conveyor 147. The dusting brushes 148 are disposed under the strip material. The pulverulent material is fed through tubular shafts 149 to distributor plates 150 which scatter the material into the bristles by centrifugal action, said distributor plates being set far enough between the ends of the bristles to permit the ends thereof to strike the sides of the strip material as it revolves. This has the tendency to throw the pulverulent material onto the top of the strip at the same time the material is brushed onto the bottom thereof. As the strip material passes under the top brushes 151, the pulverulent material is brushed thereon. This arrangement is efficient using a pair of brushes in each group, all the brushes being dusting brushes.

In operation a switch is closed to start the motor 98 which through the belt and pulley drives cause the brushes to revolve. The strip material is delivered to the apparatus by the conveyor belt 1, and started through the dusting chamber 4 by attaching a pilot plate to the end of the strip material. Said pilot plate is then pushed through the chamber into the take-away conveyor belt 9 whereupon the pilot plate is removed.

The dusting material feeds from the hopper 55 to the chute 54 from where it falls by gravity into the funnels 52, through the tubular shafts 41 into the distributor plates 65 of the upper brushes 30 of the first group 29. From the plates 65 the dusting material is thrown by centrifugal force into the bristles 32 of the upper brushes 30 to be brushed onto the top surface and edges of the strip material. A portion of dusting material falls onto the distributor plates 67 attached to the lower brushes from where it is scattered or thrown into the bristles 32 of the lower brushes 31 and brushed onto the bottom surface and side edges of the strip material.

From the first group of dusting brushes 29 the strip material passes to the second group of brushes 76 comprising upper brushes 88 and lower brushes 77 which brush the excess dusting material from the strip material, leaving a smooth, even dust coat thereon. The strip material then passes to the take-away conveyor belt 9 for further processing, comprising cutting to length, splicing of the ends and vulcanizing to form finished inner tubes for automobile tires and the like.

While the tube stock is passing through the dusting chamber, the venting system is in constant operation, creating a negative pressure in the chamber to remove the dust-laden air therefrom.

While certain representative embodiments and details have been shown for the purpose of illustrating the invention, it will be apparent to those skilled in the art that various changes and modifications may be made therein without departing from the spirit or scope of the invention.

I claim:

1. An apparatus for coating a flexible tacky tube stock of continuous length with a pulverulent material, said apparatus comprising a conveyor means defining a path of travel for the tube stock; means supplying a substantially continuous flow of pulverulent material; a first brushing means embodying a plurality of members disposed in horizontally contiguous relation and transversely of the path of travel of the conveyor means; driving means for supporting and rotating said brushing means; means delivering the pulverulent material from the supply means to said brushing means; distributing means mounted on and disposed internally of said brushing means substantially normal to the flow of the pulverulent material from the delivery means; a second brushing means spaced from the first and embodying a plurality of members disposed in horizontally contiguous relation and transversely of the path of travel of the conveyor means; and driving means for supporting and rotating said second brushing means.

2. An apparatus for coating a flexible tacky tube stock of continuous length with a pulverulent material, said apparatus comprising a chamber; a conveyor means in said chamber; means supplying a substantially continuous flow of pulverulent material to the chamber; a first brushing means embodying a plurality of members disposed in horizontally contiguous relation in said chamber and transversely of the path of travel of the conveyor means; driving means for supporting and rotating said brushing means; means delivering the pulverulent material from the supply means to said brushing means; distributing means mounted on and disposed internally of each of the members of said brushing means substantially normal to the flow of the pulverulent material from the delivery means; a second brushing means spaced from the first and embodying a plurality of members disposed in horizontally contiguous relation in said chamber; and driving means for supporting and rotating said second brushing means.

3. An apparatus for coating a flexible tacky tube stock of continuous length with a pulverulent material, said apparatus comprising a conveyor means defining a path of travel for the tube stock; means supplying a substantially continuous flow of pulverulent material; brushing means disposed transversely of the path of travel of the conveyor means embodying at least two upper brushes arranged in superposed relation to each of a corresponding number of lower brushes, said upper and lower brushes being disposed in at least partial contact with adjacent upper and lower brushes; driving means for supporting and rotating said brushing means; means delivering the pulverulent material from the supply means to said brushing means; and distributing means mounted on and disposed internally of each of the upper and lower brushes of the brushing means substantially normal to the flow of the pulverulent material from the delivery means.

4. Apparatus of the type defined in claim 3 in which there is provided means for removing the excess pulverulent material from the tube stock, said means comprising a second brushing means corresponding generally to the first mentioned brushing means.

5. An apparatus for coating a flexible tacky tube stock of continuous length with a pulverulent material, said apparatus comprising a conveyor means defining a path of travel for the tube stock; means supplying a substantially continuous flow of pulverulent material; brushing means disposed transversely of and completely encompassing the path of travel of the conveyor means embodying at least two upper brushes arranged in superposed relation to each of a corresponding number of lower brushes, said upper and lower brushes being disposed in at least partial contact with adjacent upper and lower brushes; driving means for supporting and rotating said brushing means; a conduit delivering the pulverulent material from the supply means to said brushing means; distributing means mounted on and disposed internally of each of the upper and lower brushes of the brushing means substantially normal to the flow of the pulverulent material from the conduit; and means for removing the excess pulverulent material.

6. An apparatus for coating a flexible tacky tube stock of continuous length with a pulverulent material, said apparatus comprising a chamber; a conveyor means defining a path of travel for the tube stock through said chamber; means supplying a substantially continuous flow of pulverulent material to the chamber; a first brushing means embodying a plurality of members disposed in horizontally contiguous relation in said chamber and transversely of the path of travel of the conveyor means; driving means for supporting and rotating said brushing means; means delivering the pulverulent material from the supply means to said brushing means; distributing means mounted on and disposed internally of said brushing means substantially normal to the flow of the pulverulent material from the delivery means; a second brushing means spaced from the first and embodying a plurality of members disposed in horizontally contiguous relation in said chamber and transversely of the path of travel of the conveyor means; and driving means for supporting and rotating said second brushing means.

7. Apparatus of the type defined in claim 6 in which the first brushing means embodies at least two upper brushes arranged in superposed relation to each of a corresponding number of lower brushes, said upper and lower brushes being disposed in at least partial contact with adjacent upper and lower brushes.

8. Apparatus of the type defined in claim 6 in which there is provided means introducing a negative pressure to the chamber for the removal of the excess pulverulent material therefrom.

9. Apparatus of the type defined in claim 7 in which the second brushing means embodies an arrangement of a plurality of brushes corresponding to that of the first brushing means.

EVERETT D. GEORGE.

REFERENCES CITED

The following references are of record in the file of this patent:

UNITED STATES PATENTS

| Number | Name | Date |
|---|---|---|
| 1,183,887 | Leatherbee | May 23, 1916 |
| 1,238,561 | Ohl | Aug. 28, 1917 |
| 1,566,800 | MacArthur | Dec. 22, 1925 |
| 2,065,306 | Friess | Dec. 22, 1936 |

FOREIGN PATENTS

| Number | Country | Date |
|---|---|---|
| 563,002 | France | Sept. 18, 1923 |